Jan. 23, 1934.  T. B. MONTGOMERY  1,944,189
REGULATOR SYSTEM
Filed Feb. 1, 1932
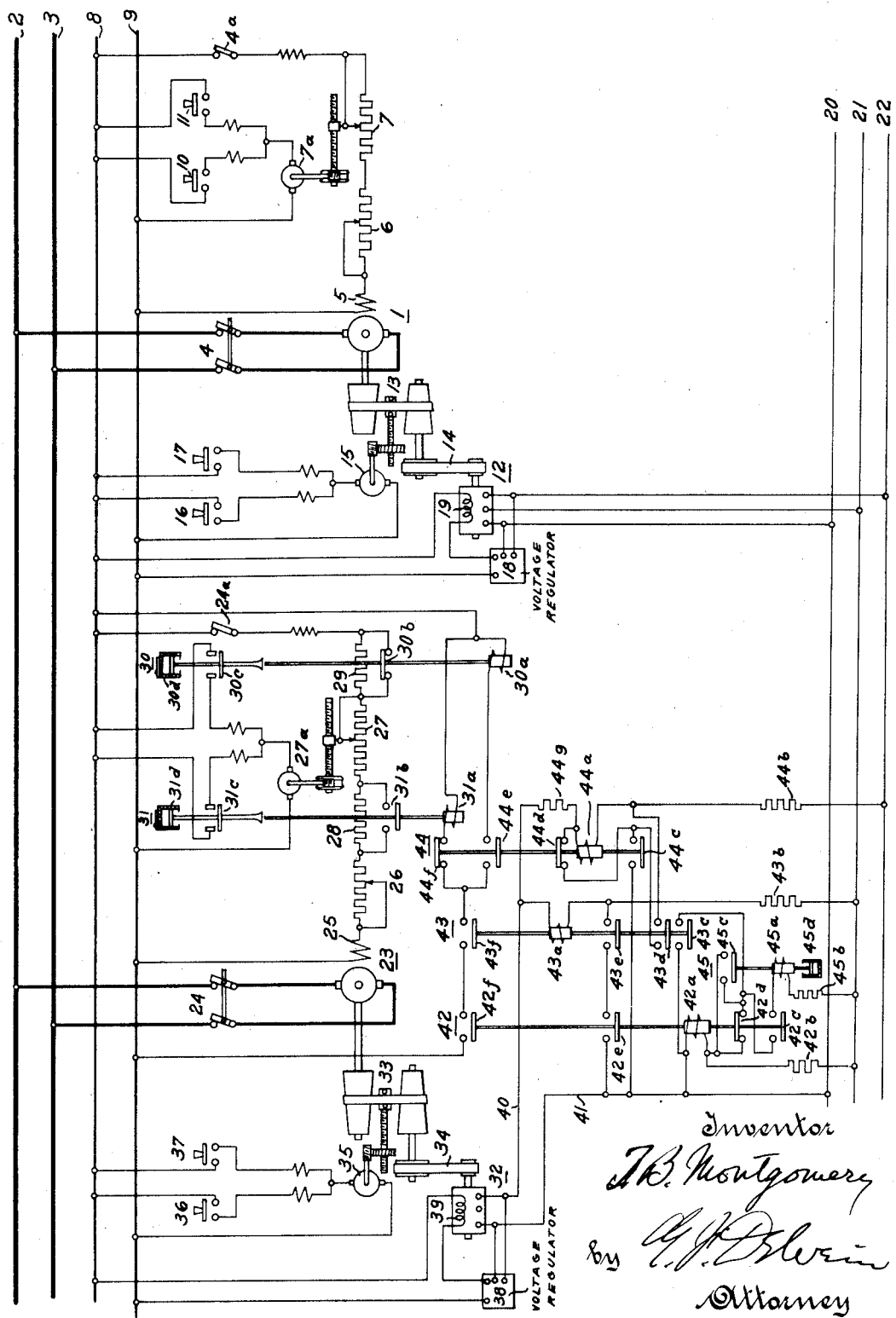

Patented Jan. 23, 1934

1,944,189

UNITED STATES PATENT OFFICE 1,944,189

REGULATOR SYSTEM

Terryl B. Montgomery, Milwaukee, Wis., assignor to Allis-Chalmers Manufacturing Company, Milwaukee, Wis., a corporation of Delaware Application February 1, 1932. Serial No. 590,085

12 Claims. (Cl. 172—293)

This invention relates in general to regulating systems and more particularly to systems for controlling the speed of the rotating elements of tandem rolling and drawing mills, paper making mills, tube welding mills, and the like.

The advantages and utility of applicant's invention are best understood by reference to the rolling mill art wherein billets of metal are passed through rolls which are arranged in tandem and driven at speeds which necessarily vary considerably due to the elongation of the billets. In such mills it is essential that the speeds of each successive set of rolls be maintained within very close limits to prevent stretching and buckling of the stock passing through the rolls. The permissible variation in speed is even less in paper mills on account of the weakness of the stock passing through the rolls. In the tandem mill installations of the prior art many of the speed control systems are sluggish in responding to small variations of speed especially where billets or tubes instead of long continuous strips of stock are passed at high rates of speed through the mill.

It is an object of this invention to provide an improved quick-acting control system for motors which must run at definite speed ratios relative to each other and to a master motor.

Another object of this invention is to provide a system for controlling the speeds of motors in which regulation within very close limits is accomplished by relays which are responsive to the phase displacement of alternating E. M. F.'s generated in accordance with the speeds of the various motors.

A further object of this invention is to provide a regulator system having a high-speed regulator, a low-speed regulator and a plurality of sequentially operating relays for controlling said regulators.

These and other objects are attained by this invention, various novel features of which will be apparent from the description and drawing herein and will be more particularly pointed out in the claims.

An illustrative example of the application of this invention is shown in the accompanying drawing.

Referring now to the drawing, a master motor, generally indicated by 1, drives the master rolls of a tandem rolling mill or the like. The armature circuit of this motor is energized when switch 4 is closed from main bus 2—3 which receives direct current energy from a suitable source of direct current such as a motor generator set (not shown). Main motor field winding 5 is connected through manual rheostat 6 and rheostat 7 to control bus 8—9 which is supplied with direct current energy from a suitable source such as a motor generator set (not shown). Reversible servo-motor 7a for operating rheostat 7 is selectively connectible to control bus 8—9 by either speed-up push button 10 or slow-down push button 11. A 3-phase generator 12 is driven by main motor 1 through variable speed drive 13 and belt 14. A reversible servo-motor 15 for controlling the ratio of variable speed drive 13 is selectively connectible to bus 8—9 by means of push buttons 16 and 17. The polyphase terminals of generator 12 are connected to 3-phase control bus 20—21—22. A voltage regulator 18 is actuated to maintain constant voltage on the terminals of generator 12 by controlling the excitation of field winding 19 which is energized from the direct current bus 8—9.

An auxiliary motor 23 for driving the auxiliary rolls of the mill is energized from main bus 2—3 through switch 24 which may be opened when it is not desired to operate this section of the mill. Field winding 25 is connected to direct current bus 8—9, through manual rheostat 26, field forcing resistance 28, servo-motor controlled rheostat 27, and field forcing resistance 29. Rheostat 27 is controlled by reversible servo-motor 27a, the direction of which is controlled by time delayed contacts 30c and 31c, respectively. Each of said resistances 28 and 29 is of higher resistance than rheostat 27. A switch generally indicated by 30 comprises a coil 30a, field forcing contacts 30b, servo-motor controlling contacts 30c, and a time delay device 30d. A switch generally indicated by 31 comprises a coil 31a, field forcing contacts 31b, servo-motor controlling contacts 31c, and a time delay device 31d. It is to be noted that a lost-motion connection between the lower and upper portions of switches 30 and 31 permit contacts 30c and 31c to move upward quickly and that dash-pots 30d and 31d cause these contacts to move down slowly whereby servo-motor 27 will be energized sufficiently long to move rheostat 27 when switches 30 and 31 are rapidly and periodically actuated.

An alternating current generator 32 is driven by auxiliary motor 23 through variable speed drive 33 and belt 34. A reversible servo-motor 35 for controlling the ratio of variable speed drive 33 is selectively connectible to bus 8—9 by means of push buttons 36 and 37. A voltage regulator 38 is actuated to maintain constant voltage on the terminals of generator 32 by controlling the excitation of field winding 38 which is energized from the direct current bus 8—9.

A single phase E. M. F. generated by generator 32 is impressed upon conductors 40 and 41. Conductor 41 is connected to conductor 20 of the 3-phase control bus. The operating winding 42a of relay 42 is connected across conductors 20 and 21 of the 3-phase control bus through current limiting resistance 42b. Operating winding 43a of relay 43 is connected from conductor 40 to conductor 21 of the 3-phase control bus through current limiting resistance 43b. Operating winding 44a of relay 44 is connected from conductor 40 to conductor 22 of the 3-phase control bus through current limiting resistances 44b and 44g. The operating winding 45a of timing relay 45 is connected across conductor 41 and conductor 21 through current limiting resistance 45b when contacts 42c and 43c are closed.

For a more complete description of the manner in which relays similar to relays 42 to 45, inclusive, are operated in response to the vectorial variations of voltages, reference should be made to the patent of Paul M. Stivender, No. 1,844,719, issued February 9, 1932, and assigned to Allis-Chalmers Manufacturing Company. In general, the operation of relays 42 to 45 is as follows: Assuming that generators 12 and 32 are producing E. M. F.'s which are equal in frequency and are substantially in phase with each other, relay 42 will be picked-up because its operating winding 42a is connected through resistance 42b across conductors 20 and 21 of the 3-phase bus. Relay 43 remains in the open or deenergized position shown, because the E. M. F. between conductors 40 and 21 is at this time zero because relay winding 43a is connected so as to be energized by the algebraic difference of the E. M. F.'s between conductors 40 and 41 and conductors 20 and 21. Relay 44 also remains in the position shown, because the E. M. F. between conductors 40 and 22 is insufficient to actuate this relay. Relay 45 also remains in the position shown, because the control circuit for its operating winding (45a) is incomplete by reason of open contacts 43c.

Consider that the speed of motor 23 drops relative to the speed of motor 1 due, for example, to an increase of load. The frequency of the E. M. F. between conductors 40 and 41 will drop relative to the master frequency of the bus 20—21—22 causing a vectorial displacement of the E. M. F. between conductors 40 and 41 relative to the E. M. F.'s of the 3-phase bus 20—21—22. Relay 42 remains in its closed or energized position because the voltage between conductors 20 and 21 is held constant by the voltage regulator 18. After this vectorial displacement continues for a predetermined number of degrees the vector sum of the E. M. F. between conductors 40 and 41 and the E. M. F. between conductors 20 and 22 will increase sufficiently to cause relay 44 to pick up. The closure of contacts 44c and 44e merely prepare control circuits which are rendered complete by the subsequent closure of other contacts. After the vectorial displacement of voltages continues for another predetermined number of degrees the vector sum of the E. M. F. between conductors 40 and 41 and the E. M. F. between conductors 20 and 21 will increase sufficiently to cause relay 43 to pick up. The closure of contact 43c connects operating winding 45a across conductors 20 and 21 and causes contacts 45c to slowly move toward their closed position. The closure of contacts 43d establishes a maintaining circuit for switch 44 from conductor 40, through resistance 44g, winding 44a, contacts 43d, contacts 44c, to conductor 41. The closure of contacts 43c establishes a maintaining circuit for switch 43 from conductor 40 through operating winding 43a, contacts 43e, and contacts 42e, to conductor 41. The closure of contacts 43f completes a control circuit for switch 30 from conductor 9, through contacts 42f, 43f, and 44e, through operating winding 30a to conductor 8.

Actuation of switch 30 causes field forcing resistance 29 to be immediately inserted in series with field winding 25 and also causes contacts 30c to close to operate servo-motor 27a in such a direction as to cause more of the resistance of rheostat to be inserted in the field circuit.

After a definite time, determined by the setting of dashpot 45d, contacts 45c move to their closed position thereby shortcircuiting operating winding 42a which causes switch 42 to drop out, noting that contacts 43c are closed.

The opening of contacts 42c disconnects timing relay 45 from conductors 20 and 21 and permits its return to the position shown. Contacts 42d close before contacts 43c open thereby locking out relay 42 in order to make certain that relay 42 will not immediately reclose and reestablish the maintaining circuit for relay 43 before contacts 43c open. Contacts 42e open to break the maintaining circuit for relay 43. Contacts 42f open to deenergize switch 30.

Relay 43 in dropping open further breaks its own maintaining circuit through contacts 43e, and also opens the above described lock-out circuit for relay 42 through contacts 42d and 43c. Contacts 43d in opening break the maintaining circuit for relay 44 which therefore opens.

Relay 44 in dropping open breaks its own maintaining circuit through contact 44c, and all the relays and switches are then in the positions illustrated except that contacts 30c will remain closed long enough after the deenergization of operating winding 30a to permit servo-motor 27a to notch around a predetermined amount. Relay 42 will, of course, pick up again as soon as contacts 43c open. The above described cycle of operations will occur once for each vectorial revolution of the E. M. F. between conductors 40 and 41 relative to the E. M. F. of the 3-phase control bus and will continue until the E. M. F. between the conductors 40 and 41 is caused to return to the initial vector position relative to the E. M. F.'s of the control bus 20, 21 and 22; that is, until the vector difference of the E. M. F.'s impressed on relay winding 43a remains substantially zero. Although it is desirable that the 3-phase control bus 20—21—22 be energized by a generator driven by one of the mills, it is to be understood that the generator may be driven at various speeds by a separate constant speed motor, in a manner such as disclosed in the patent to S. A. Staege, No. 1,763,199, June 10, 1930, and such latter motor will then act as an adjustable constant speed master motor with respect to the mill motors in regulating the speed thereof.

The operation of the relays and switches when the speed of motor 23 increases relative to the speed of motor 1 is as follows; the vector rotation of the E. M. F. between conductors 40 and 41 relative to the E. M. F.'s of the 3-phase control bus 20—21—22 is opposite to that above considered. Relay 42 picks up in the same manner as hereinbefore described. After the E. M. F. between conductors 40 and 41 vectorially rotates for a predetermined number of degrees relative to the E. M. F. between conductors 20 and 21, the vector sum of these voltages will be sufficiently high to cause relay 43 to pick up. The closure of contacts 43c of relay 43 connects timing relay 45 across conductors 20 and 21, noting that contacts 42c are already closed. The closure of contacts 43d completes a lock-out circuit around operating winding 44a and including contacts 44d thus preventing the actuation of relay 44. The closure of contacts 43e establishes a maintaining circuit for operating winding 43a from conductor 40 through operating winding 43a through contacts 43e and 42e to conductor 41. The closure of contacts 43f causes the actuation of switch 31 by establishing a circuit from conductor 9 through contacts 42f, 43f, 44f, through operating winding 31a to conductor 8. Actuation of switch 31 immediately closes field forcing contacts 31b and servo-motor control contacts 31c. The field strength of motor 23 will thus be rapidly increased by reason of the exclusion of field forcing resistor 28 and servo-motor 27a will be caused to move in such a direction as to restore equilibrium of speed ratios.

After a definite time determined by a setting of dash-pot 45d, contacts 45c move to their closed position thereby short-circuiting operating winding 42a which causes switch 42 to drop out, and causing the relays 42 to 45 to be restored to their initial position in a manner substantially the same as above described.

It is thus seen that the sequence of operation of relays 42 to 45, inclusive, is dependent upon the direction and speed at which the auxiliary motor 23 varies relative to the speed of the master motor 1. For example, a departure in one direction will cause the relays to close in the following order, 42, 44, 43, 45, and a departure in the opposite sense will cause the relays to close in the following order, 42, 43, 45. It is also apparent that a corrective impulse is initiated before the E. M. F. vector of generator 32 departs in phase position more than half a cycle relative to the frequency of generator 12 and that a corrective impulse is initiated when there is a predetermined relative phase departure even though the frequencies of generators 19 and 39 remain substantially equal after the phase departure.

Due to the fact that relative phase displacement, as distinguished from variation in the magnitude of E. M. F., of the alternating currents supplied by the alternating current control generators driven by the master motor and the mill motors is utilized for securing the desired speed regulation of the mill motors, and the fact that the load on these control generators is relatively small, the provision of automatic voltage regulators for the fields of these control generators, particularly where the fields of the control generators are supplied from the same D. C. source, such as the bus 8—9, of substantially constant voltage, is not essential; for appreciable variations in the magnitude of the E. M. F.'s of the currents produced by these control generators will not adversely affect to any substantial extent the desired speed regulation of the motors. And substantial variation in the matter of a selected definite frequency of the currents supplied by the several control generators may be made without adversely affecting to any appreciable extent the desired speed regulation of the motors, for the substantial reactance of the circuits of these control generators, the operating windings of the control relays in such circuits constituting such an element of reactance, serves to minimize current changes in these circuits incident to change in frequency, to the end that suitable power current is available for desired operation of the control relays under these conditions of different selected generator speeds and frequencies.

It is desirable that the motor in the mill which is least subject to speed variation due to load be the master motor, in fact, the master motor should preferably have a substantially constant speed characteristic in order to reduce the activity of the various regulating devices.

Although only one auxiliary motor has been shown it will be understood by those skilled in the art that a mill installation will comprise a plurality of such motors each provided with control apparatus identically the same as the control apparatus associated with motor 23, noting that the buses 2—3, 8—9 and 20—21—22 will extend on to the additional auxiliary motors.

It is to be understood that the disclosure herein described is merely illustrative of the invention and is not to be taken in a limiting sense, changes in details of construction and arrangement of parts being permissible so long as within the spirit of the invention and the scope of the claims which follow.

It is claimed and desired to secure by Letters Patent:

1. In a regulating system for maintaining predetermined speed ratios among a plurality of electric motors with respect to a master motor, the combination of a field forcing regulator and a time delayed follow-up regulator for each of said electric motors, a plurality of relays for controlling each of said regulators, and means for intermittently actuating said relays upon occurrence of a departure in speed of the respective motors from said predetermined speed ratio.

2. In a regulator system, the combination of a main motor, a first generator driven by said main motor for producing at least one alternating E. M. F. having a frequency proportional to the speed of said main motor, an auxiliary motor, means for varying the speed of said auxiliary motor, a second generator driven by said auxiliary motor for producing at least one alternating E. M. F. having a frequency proportional to the speed of said auxiliary motor, a plurality of relays having contacts connected so as to initiate speed increasing operation of said speed varying means when actuated in one sequence and to initiate speed decreasing operation of said speed varying means when actuated in a different sequence, and means for causing said relays to periodically operate in said one sequence in response to a decrease in the frequency produced by said second generator relative to the frequency produced by said first generator and for causing said relays to periodically operate in said different sequence in response to an increase in the frequency produced by said second generator relative to the frequency produced by said first generator.

3. In a regulator system, the combination of a main motor, a first generator driven by said main motor for producing at least one alternating E. M. F. having a frequency proportional to the speed of said main motor, an auxiliary motor, means for varying the speed of said auxiliary motor including a pilot motor operated rheostat, a second generator driven by said auxiliary motor for producing at least one alternating E. M. F. having a frequency proportional to the speed of said auxiliary motor, a pair of reversing contact elements operable to control said pilot motor, means for causing one of said contact elements to periodically operate in response to an increase of the frequency produced by said second generator relative to the frequency produced by said first generator, said means comprising a pair of relays having operating windings normally connected so as to be energized by the vector sum of the E. M. F.'s produced by said generators, one of said relays having an auxiliary contact operable upon energization thereof prior to the energization of the other of said relays to temporarily de-energize said other of said relays.

4. In a system wherein a master machine and a plurality of other machines are required to operate with predetermined speed relationships, the combination of means for adjusting the speed of said master machine, a plurality of speed regulators for each of said other machines, means associated with said master machine for producing a polyphase E. M. F. having a frequency proportional to the speed of said master machine, means associated with each of said other machines for producing single phase E. M. F.'s having frequencies proportional to the speeds of said other machines respectively, a plurality of relays associated with each of said other machines for controlling said speed regulators respectively, and means for so impressing said polyphase E. M. F.'s and said single phase E. M. F.'s on the relays associated with each of said other machines that said relays actuate in predetermined orders to control said speed regulators respectively.

5. In a system wherein a master machine and a plurality of other machines are required to operate with predetermined speed relationships, the combination of means for adjusting the speed of said master machine, a plurality of speed regulators for each of said other machines, means associated with said master machine for producing a polyphase E. M. F. having a frequency proportional to the speeds of said master machine, means associated with each of said other machines for producing single phase E. M. F.'s having frequencies proportional to the speeds of said other machines respectively, a plurality of relays associated with each of said other machines for controlling said speed regulators respectively, and means for causing said plurality of relays to intermittently actuate in response to the vector sum of said polyphase E. M. F. and the respective single phase E. M. F.'s produced by said second mentioned means.

6. Means for maintaining predetermined speed ratios among a plurality of motors, comprising a speed regulator for each motor, means associated with each motor for producing alternating E. M. F.'s having frequencies proportional to the speeds of the respective motors, a source of alternating E. M. F. of substantially constant frequency, a plurality of relays associated with each motor for controlling each speed regulator, and means for so connecting the operating windings of said relays in circuit with said source of alternating E. M. F. and with said means for producing alternating E. M. F.'s respectively that said relays are actuated in different predetermined orders when the E. M. F.'s impressed thereon vary in phase.

7. Means for maintaining predetermined speed ratios among a plurality of motors, comprising a speed regulator for each motor, switch mechanism for controlling the speed increasing and speed decreasing operation of each speed regulator, a plurality of relays operable to cause speed increasing or speed decreasing operation of said switch mechanism selectively, means associated with each motor for producing alternating E. M. F.'s having frequencies proportional to the speeds of the respective motors, a source of alternating E. M. F. of substantially constant frequency, and means for so impressing the vectorial sum of the E. M. F. of said source and the E. M. F.'s produced by said first mentioned means on the operating windings of the relays associated with each motor that said relays are caused to operate in different sequences dependent upon the frequency of said E. M. F. relative to the frequency of said source.

8. In a speed regulating system, the combination of an electric motor having a field winding, a regulator for varying the excitation of said field winding, a source of alternating E. M. F. of substantially constant frequency, a generator driven by said motor for producing an alternating E. M. F. having a frequency proportional to the speed of said motor, a plurality of relays, means for so connecting the operating windings of said relays in circuit with said source and said generator that said relays intermittently operate in one sequence when the frequency of said generator is below the frequency of said source and in a different sequence when the frequency of said generator is above the frequency of said source, and means dependent upon the sequence of operation of said relays for controlling said regulator.

9. In a regulator system, the combination of a dynamo-electric machine having a field winding, means for varying the excitation of said winding comprising a servo-motor actuated rheostat, two field forcing resistances, and a pair of switches having normally open and normally closed contacts connected across said resistances respectively, and each having time delayed contacts for controlling the actuation of said rheostat, a plurality of relays, and means responsive to the sequence of actuation of said relays for controlling said first mentioned means.

10. In a speed control system having a substantially constant speed motor and at least one other motor, means for varying the speed of said other motor comprising a servo-motor actuated rheostat and two resistances each having higher resistance than said rheostat, a pair of contactors for inserting and shunting said resistances respectively upon selective operation thereof, a pair of time delayed contact devices arranged to be actuated by said contactors respectively and connected so as to control the direction of operation of said servo-motor actuated rheostat, means for producing alternating voltages having frequencies proportional to the speed of said motors, a plurality of relays having operating windings connected so as to be energized by the vector sum of certain of said voltages and having contacts for selectively energizing said contactors and for thereby causing the actuation of said servo-motor actuated rheostat.

11. In a regulator system, the combination of a dynamo-electric machine having a field winding, means for varying the excitation of said winding comprising a servo-motor actuated rheostat, two field forcing resistances, and a pair of switches having normally open and normally closed contacts connected across said resistances respectively, and each having time delayed contacts for controlling the actuation of said rheostat, means for producing an E. M. F. having a frequency proportional to the speed of said machine, means for producing an E. M. F. of predetermined frequency, constant voltage regulators for each of said last mentioned means, and means responsive to the vector displacement of said E. M. F.'s for causing said pair of switches to selectively and periodically operate.

12. In a speed regulator system, the combination of a main electric motor, means for controlling the speed of said main motor, means for producing an alternating E. M. F. having a frequency proportional to the speed of said main motor, an auxiliary electric motor having a field winding, means for controlling the excitation of said field winding, means for producing an alternating E. M. F. having a frequency proportional to the speed of said auxiliary motor, one of said E. M. F.'s being polyphase and the other of said E. M. F.'s being single phase, means for controlling the operation of said excitation controlling means in response to a phase displacement of said E. M. F.'s, said last mentioned means comprising a pair of relays having operating windings each arranged for energization by the vector sum of said single phase E. M. F. and different phases of said polyphase E. M. F.

TERRYL B. MONTGOMERY.